(12) United States Patent
Yamagata (10) Patent No.: US 8,117,570 B2
(45) Date of Patent: *Feb. 14, 2012

(54) INTEGRATED CIRCUIT DESIGN PHASE TECHNIQUE WITH VIRTUAL POWER SWITCH

(75) Inventor: Masahide Yamagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

This patent is subject to a terminal disclaimer.

(21) Appl. No.: 12/007,424

(22) Filed: Jan. 10, 2008

(65) Prior Publication Data

US 2008/0120587 A1 May 22, 2008

Related U.S. Application Data

(63) Continuation of application No. 11/062,806, filed on Feb. 23, 2005, now Pat. No. 7,370,293.

(30) Foreign Application Priority Data

Mar. 10, 2004 (JP) ................................. 2004-067490

(51) Int. Cl.
*G06F 17/50* (2006.01)
(52) U.S. Cl. ........................ 716/102; 716/106; 716/133
(58) Field of Classification Search .................. 716/1, 2, 716/5, 18, 102, 106, 133; 326/31–35, 80
See application file for complete search history.

(56) References Cited

U.S. PATENT DOCUMENTS 6,370,677 B1 4/2002 Carruthers et al.
7,117,457 B2 * 10/2006 Frenkil .......................... 716/113
7,138,825 B2 11/2006 Kim et al.
7,370,293 B2 5/2008 Yamagata
2001/0052800 A1 * 12/2001 Mizuno ............................. 327/1
2006/0114025 A1 6/2006 Frenkil et al.

FOREIGN PATENT DOCUMENTS

| JP | 2002-259487 | 9/2002 |
|---|---|---|
| JP | 2003-233635 | 8/2003 |
| JP | 2005-018187 | 1/2005 |

OTHER PUBLICATIONS

EPO Search Report dated Aug. 1, 2005.

(Continued)

*Primary Examiner* — Vuthe Siek
(74) *Attorney, Agent, or Firm* — Rader, Fishman & Grauer PLLC (57) ABSTRACT

An integrated circuit design system able to generate circuit data enabling a clear grasp of power switch cells and circuit cells whose power is cut off without obstructing the efficiency of the design, a method of same, and a program of same, wherein in the description of RTL data generated at an RTL data generation unit, a hierarchical block of an upper level with a lower level comprised of a hierarchical block corresponding to a circuit whose power should be cut off in response to a control signal and a predetermined virtual power switch cell to which this control signal is input is prepared. By obtaining a grasp of the relationship between the virtual power switch cells in the description of the RTL data and the hierarchical blocks of the same level as the virtual power switch cells, the relationship between the power switch cells and the circuits whose power should be cut off in a real circuit can be clearly grasped.

13 Claims, 9 Drawing Sheets

OTHER PUBLICATIONS

S.I. Mutoh, et al., "A 1-V Multithreshold-Voltage CMOS Digital Signal Processor for Mobile Phone Application", IEEE Journal of Solid-State Circuits, IEEE Inc., NY, NY, vol. 31, No. 11, Nov. 1996, pp. 1795-1802.

S. Mutoh, et al, "I-V Power Supply High-Speed Digital Circuit Technology with Multithreshold-Voltage CMOS", IEEE Journal of Solid-State Circuits, IEEE Inc., NY, NY, vol. 30, No. 8, Aug. 1995, pp. 847-853.

J.T. Kai, et al., "Dual Threshold Voltage Techniques for Low-Power Digital Circuits", IEEE Journal of Solid-State Circuits, IEEE Inc., NY, NY, vol. 35, No. 7, Jul. 2000, pp. 1009-1018.

K.S. Khouri, et al., "Leakage Power Analysis and Reduction During Behavioral Synthesis", Computer Design, 2000, Proceedings, 2000 International Conference on Austin, TX, USA, Sep. 17-20, 2000, pp. 561-564.

Hyo-Sig Won, et al., "An MTCMOS Design methodology and Its Application to Mobile Computer", Proceedings of the 2003 International Symposium on Low Power Electronics and Design, Aug. 2003, International Symposium on Low Power Electronics and Design, NY, NY pp. 110-115.

J. Kato, et al., "MTCMOS Hierarchical Sizing Based on Mutual Exclusive Discharge Patterns", Design Automation Conference, 1998, Jun. 1998, pp. 495-500.

Sundararajan et al., "Low Power Synthesis of Dual Threshold Voltage CMOS VLSI Circuits," IEEE, p. 1999, pp. 139-144.

Won et al., "An MTCMOS Design Methodology and Its Application to Mobile Computing," ACM, Aug. 25-27, 2003, pp. 110-115.

Japanese Office Action dated Feb. 5, 2008 for corresponding Japanese Application No. 2004-067490.

Japanese Office Action issued Jan. 27, 2009 for corresponding Japanese Application No. 2008-177396.

Santarini, Michael, "Taking a Bite Out of Power: Techniques for Low-Power-ASIC Design" EDN Europe, Jul. 1, 2007, pp. 1-8, http://www.edn-europe.com/takingabiteoutofpowertechniquesforlowpowerasicdesign+artic.

\* cited by examiner

```
         ┌ module TOP( ... );
         │   PGBLK pg_blk( ...., .PG(pg_cnt10) );
  TOP   ┤   PGCTL pg_cntl( ...., .PGEN(pg_cnt10) );
         └ endmodule ┌ module PGCTL( ...., PGEN );
         │   output PGEN;
         │
  PGCTL ┤   always @( ) begin
         │     ....
         │   end
         │
         └ endmodule ┌ module PGBLK( ... , PG );
         │   input PG;
         │
  PGBLK ┤   PGXSW pgsw0( .SW(PG) );
         │
         │   BLK  blk0( ... );
         └ endmodule ┌ module BLK( ... );
         │
         │   always @( ) begin
  BLK   ┤     ....
         │   end
         │
         └ endmodule
```

```
module PGSW( PGEN );
  input PGEN;

initial begin
      VERIFY HIERARCHICAL BLOCK EXISTING AT SAME LEVEL ;
      LIST SIGNAL INTERCONNECTS IN ABOVE HIERARCHICAL BLOCK
  end always @( PGEN )
      if ( PGEN ) begin
          FIX LOGICAL VALUES OF LISTED SIGNAL INTERCONNECTS
          TO NONSPECIFIC VALUES ;
      end
      else begin
          RELEASE FIX TO NONSPECIFIC VALUES
      end endmodule
```

TIME OF START OF SIMULATION { (initial block)

DURING EXECUTION OF SIMULATION { (always block)

INTEGRATED CIRCUIT DESIGN PHASE TECHNIQUE WITH VIRTUAL POWER SWITCH

CROSS REFERENCE TO RELATED APPLICATIONS

The present application is a Continuation Application of the patent application Ser. No. 11/062,806, filed Feb. 23, 2005, now issued U.S. Pat. No. 7,370,293, which in turn claims priority from Japanese application No. 2004-067490 filed on Mar. 10, 2004, the entire contents of which are incorporated herein by reference.

BACKGROUND OF THE INVENTION

1. Field of Invention

The present invention relates to an integrated circuit design system, an integrated circuit design program, and an integrated circuit design method.

2. Description of the Related Art

In order to deal with an increasing reduction in power consumption and miniaturization of processing dimensions, the power supply voltage of semiconductor integrated circuits has been reduced year by year. If the signal amplitude becomes small due to the reduction of the power supply voltage, the threshold voltages of the transistors will become relatively high with respect to the signal amplitude; therefore the ON currents of the transistors will decrease and the delays will increase. For this reason, the threshold voltages of the transistors must also be reduced along with the power supply voltage. However, if the threshold voltages of the transistors are lowered, the leakage current in the OFF state will increase, so the disadvantage will arise that the reduction of the power consumption will be obstructed.

As technology for preventing an increase of such leakage current, the "multi-threshold complementary metal oxide semiconductor (MTCMOS)" circuit technology is known. In the MTCMOS technology, a transistor having a high threshold voltage is inserted into the power supply line for each circuit block performing a specific function. When the circuit block becomes unused, this transistor switch is set OFF, so the leakage current flowing through the transistors in the circuit block is cut off. Due to this, the wasteful leakage current flowing in unused circuit blocks can be greatly reduced.

Figure 10:
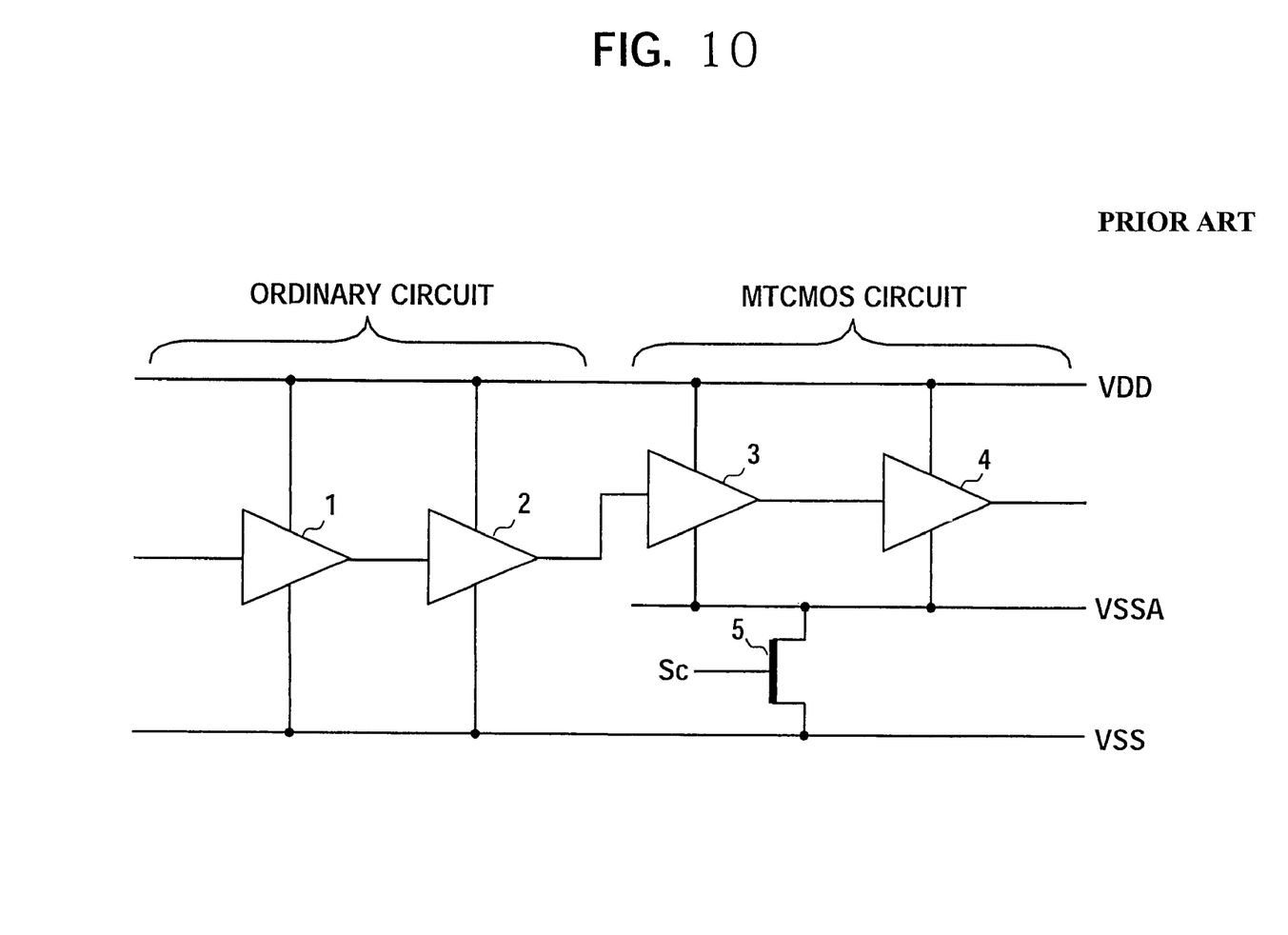
FIG. 10 is a view of an example of a circuit using MTCMOS technology.

FIG. 10 is a view of an example of a circuit using MTCMOS technology. Circuit cells 1 and 2 are connected between a power supply line VDD and a ground line VSS and constantly supplied with power. Contrary to this, circuit cells 3 and 4 are connected between the power supply line VDD and a virtual ground line VSSA. These are supplied with power only when the virtual ground line VSSA and the ground line VSS are connected by a high threshold voltage transistor 5.

The high threshold voltage transistor 5 is controlled to be turned on/off in response to a control signal Sc from a not illustrated circuit block. When the circuit cells 3 and 4 become unused, this control signal Sc is set to the low level, so the high threshold voltage transistor 5 becomes OFF. Due to this, the virtual ground line VSSA and the ground line VSS are cut off, and the leakage current of the circuit cells 3 and 4 is cut off.

The circuit cut off from power by the high threshold voltage transistor (hereinafter referred to as an "MTCMOS circuit") becomes unstable in the signal level of the internal interconnect at the time of shutting off the power. For this reason, in order to prevent the signal in this unstable state from causing a malfunction or otherwise exerting an adverse influence upon the other circuit blocks in operation, processing such as conversion of the unstable state signal to a fixed value is applied. Accordingly, in the design of a semiconductor integrated circuit using MTCMOS technology, it is necessary to correctly verify if the power is correctly turned on/off according to the specifications and whether any malfunctions due to the signal in the unstable state occur.

In a general integrated circuit design system, however, at the stage of the logic design, the power supply of the circuit is treated as being always on, i.e., the situation of the cutoff of the power is not envisioned. For this reason, a circuit turned on/off in power during operation such as an MTCMOS circuit cannot be simulated at the stage of the logic design.

Japanese Unexamined Patent Publication (Kokai) No. 2003-233635 discloses a method of preparation of a logic model by a hardware description language of a digital circuit including an MTCMOS circuit. The method of Japanese Unexamined Patent Publication (Kokai) No. 2003-233635 enables the simulation of a digital circuit, even when an MTCMOS circuit is included, by adding to a higher level of the circuit that turned off the power a description making the value of an input pin in the stand-by state a nonspecific value.

However, the description of the circuit prepared by the method of Japanese Unexamined Patent Publication (Kokai) No. 2003-233635 does not include a description clearly indicating each circuit cell including a high threshold voltage transistor for a power switch (power switch cell) and also does not include a description clearly indicating which circuit cell is cut off from power by which power switch cell. For this reason, when designing the next stage, that is, designing the layout such as the interconnects and arrangement of the circuit cells by using a net list of gate levels obtained as a result of the logic design, the information concerning the above power switch cells must be newly manually added. Accordingly, it suffers from the disadvantage that the efficiency of the design is obstructed, for example, the load of the design work becomes large and human design error easily occurs.

Further, the description added by the method of Japanese Unexamined Patent Publication (Kokai) No. 2003-233635 is only used for the verification of the circuits and is unnecessary in the layout design, so must be deleted. Accordingly, the trouble of such work occurs and becomes a cause obstructing the efficiency of design.

SUMMARY OF THE INVENTION

An object of the present invention is to provide an integrated circuit design system, an integrated circuit design program, and an integrated circuit design method able to generate circuit data capable of enabling a clear grasp of power switch cells and circuit cells cut off in power by the same without obstructing the efficiency of design.

According to a first aspect of the invention, there is provided an integrated circuit design system for designing an integrated circuit based on circuit data describing a logic circuit by a hierarchical structure including a lower hierarchical block in an upper hierarchical block, provided with a circuit data generating means for acquiring circuit data describing a circuit to which an application of power should be cut off in response to a control signal as a first hierarchical block and generating circuit data describing a second hierarchical block with a lower level comprised by the first hierarchical block and a predetermined power switch cell to which the control signal is input based on the acquired circuit data.

According to the first aspect of the invention, in the description of the circuit data generated by the circuit data generating means, a second hierarchical block with a lower level comprised by a first hierarchical block corresponding to a circuit whose power should be cut off in response to a control signal and a predetermined power switch cell to which the control signal is input is prepared.

For this reason, from the relationship between predetermined power switch cells and hierarchical blocks of the same level in the description of the circuit data generated by the circuit data generating means, the relationship between the power switch cells and the circuits for cutoff of the power supply in a real circuit is clearly grasped. Further, the power switch cells in the description of the circuit data correspond to the power switch cells in the real circuit, so it is not necessary to delete the description of the power switch cells in the design of the layout stage.

Preferably, the first aspect of the invention is further provided with a simulating means for simulating operation of a circuit according to a description of the circuit data generated at the generating means, wherein when the circuit data includes a description of a power switch cell, the simulating means acquires a list of signal interconnects included in a hierarchical block of the same level as the power switch cell when starting a simulation, fixes the logical values of signal interconnects included in the acquired list to nonspecific values and continues the simulation when a control signal instructing cutoff of power is input to the power switch cell in the process of the simulation operation, and releases the fix of the logical values of the signal interconnects included in the acquired list to nonspecific values and continues the simulation when a control signal instructing supply of power is input to the power switch cell in the process of the simulation operation.

According to the above configuration, when the description of a power switch cell is included in the description of the circuit data generated by the circuit data generating means, the simulating means acquires a list of the signal interconnects included in the hierarchical block of the same level as the power switch cell when starting the simulation. Further, when a control signal instructing cutoff of the power is input to a power switch cell in the process of the simulation, the logical values of the signal interconnects included in the acquired list are fixed to nonspecific values and the simulation is continued. Further, when a control signal instructing supply of power is input to a power switch cell in the process of the simulation, the fix of the logical values of the signal interconnects included in the acquired list to the nonspecific values is released and the simulation is continued.

Alternatively, preferably the circuit data generating means has a first circuit data generating means for generating circuit data describing the second hierarchical block based on circuit data describing the first hierarchical block and a second circuit data generating means for generating circuit data of a logic circuit comprised by combining predetermined circuit cells by logic combining processing on the circuit data generated at the first circuit data generating means, and the second circuit data generating means examines whether or not there is a power switch cell at the same level or an upper level for each hierarchical block of the circuit data generated at the first circuit data generating means, performs the logic combining processing by using the information of circuit cells previously prepared for a circuit cut off in power for a hierarchical block in which there is a power switch cell at the same level or an upper level as a result of the examination, and performs the logic combining processing by using information of circuit cells previously prepared for circuits not cut off in power for a hierarchical block in which there is no power switch cell at the same level or an upper level.

According to the above configuration, the second circuit data generating means examines whether or not there is a power switch cell at the same level or an upper level for each hierarchical block of the circuit data generated by the first circuit data generating means. Logic combining processing is carried out by using the information of the circuit cells previously prepared for a circuit to be cut off in power for a hierarchical block in which there is a power switch cell at the same level or an upper level as a result of this examination, and logic combining processing is carried out by using the information of circuit cells previously prepared for a circuit not to be cut off in power for a hierarchical block in which there is no power switch cell at the same level or an upper level.

Due to this, hierarchical blocks whose power should be cut off by the power switch cells and hierarchical blocks whose power is not to be cut off are logically combined by using previously prepared circuit cells.

Alternatively, preferably the circuit data generating means includes a first circuit data generating means for generating circuit data describing the second hierarchical block based on circuit data describing the first hierarchical block and a second circuit data generating means for generating circuit data describing by the hierarchical structure a logic circuit comprised by combining predetermined circuit cells by logic combining processing on circuit data generated at the first circuit data generating means and has a table preparing means for retrieving a power switch cell from the circuit data generated at the second circuit data generating means and preparing a table linking information instructing the power switch cell found by the retrieval and information individually instructing all circuit cells in the hierarchical block belonging to the same level as the power switch cell.

According to the above configuration, the second circuit data generating means performs logic combining processing on circuit data generated by the first circuit data generating means and by this generates circuit data describing a logic circuit comprised by combining predetermined circuit cells by a hierarchical structure. Then, the table preparing means performs processing for retrieving a power switch cell from the circuit data generated by the second circuit data generating means and prepares a table linking information instructing the power switch cell found by the retrieval and information individually instructing all circuit cells in the hierarchical block belonging to the same level as the power switch cell.

Due to this, a table is obtained representing the correspondence between the power switch cells and the circuit cells for cutoff of power.

Alternatively, preferably the circuit data generating means generates circuit data describing a logic circuit by the hierarchical structure by operation combining processing on operation description data describing a logic circuit by operations and prepares a description describing a circuit as the first hierarchical block and a description of the second hierarchical block with a lower level comprised by the first hierarchical block and the power switch cell according to previously given information for designating a circuit whose power should be cut off in response to a control signal at the time of generation.

According to the above configuration, the circuit data generating means performs operation combining processing on operation description data in which the logic circuit is described by operations and by this generates circuit data describing a logic circuit by the hierarchical structure. Then, at the time of this generation, according to the previously given information designating the circuit whose power should be cut off in response to a control signal, a description describing this circuit as a first hierarchical block and a description of a second hierarchical block with a lower level comprised by the first hierarchical block and a power switch cell are prepared.

According to a second aspect of the invention, there is provided an integrated circuit design program for making a computer design an integrated circuit based on circuit data describing a logic circuit by a hierarchical structure where a lower hierarchical block is included in an upper hierarchical block, including a first step of acquiring circuit data describing a circuit whose power should be cut off in response to a control signal as a first hierarchical block and a second step of generating circuit data describing a second hierarchical block with a lower level comprised by the first hierarchical block and a predetermined power switch cell to which the control signal is input based on the circuit data acquired at the first step.

According to a third aspect of the invention, there is provided an integrated circuit design method for designing an integrated circuit based on circuit data describing a logic circuit by a hierarchical structure where a lower hierarchical block is included in an upper hierarchical block, including a first step of acquiring circuit data describing a circuit to which an application of power should be cut off in response to a control signal as a first hierarchical block and a second step of generating circuit data describing a second hierarchical block with a lower level comprised by the first hierarchical block and a predetermined power switch cell to which the control signal is input based on the circuit data acquired at the first step.

According to the present invention, a circuit data enabling a clear grasp of the power switch cells and the circuit cells whose power should be cut off by this can be generated without causing work obstructing the efficiency of the design, for example, the deletion of descriptions in the layout design stage.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an explanation will be given of a design system of a semiconductor integrated circuit using MTCMOS technology according to an embodiment of the present invention by referring to the drawings.

Figure 1:
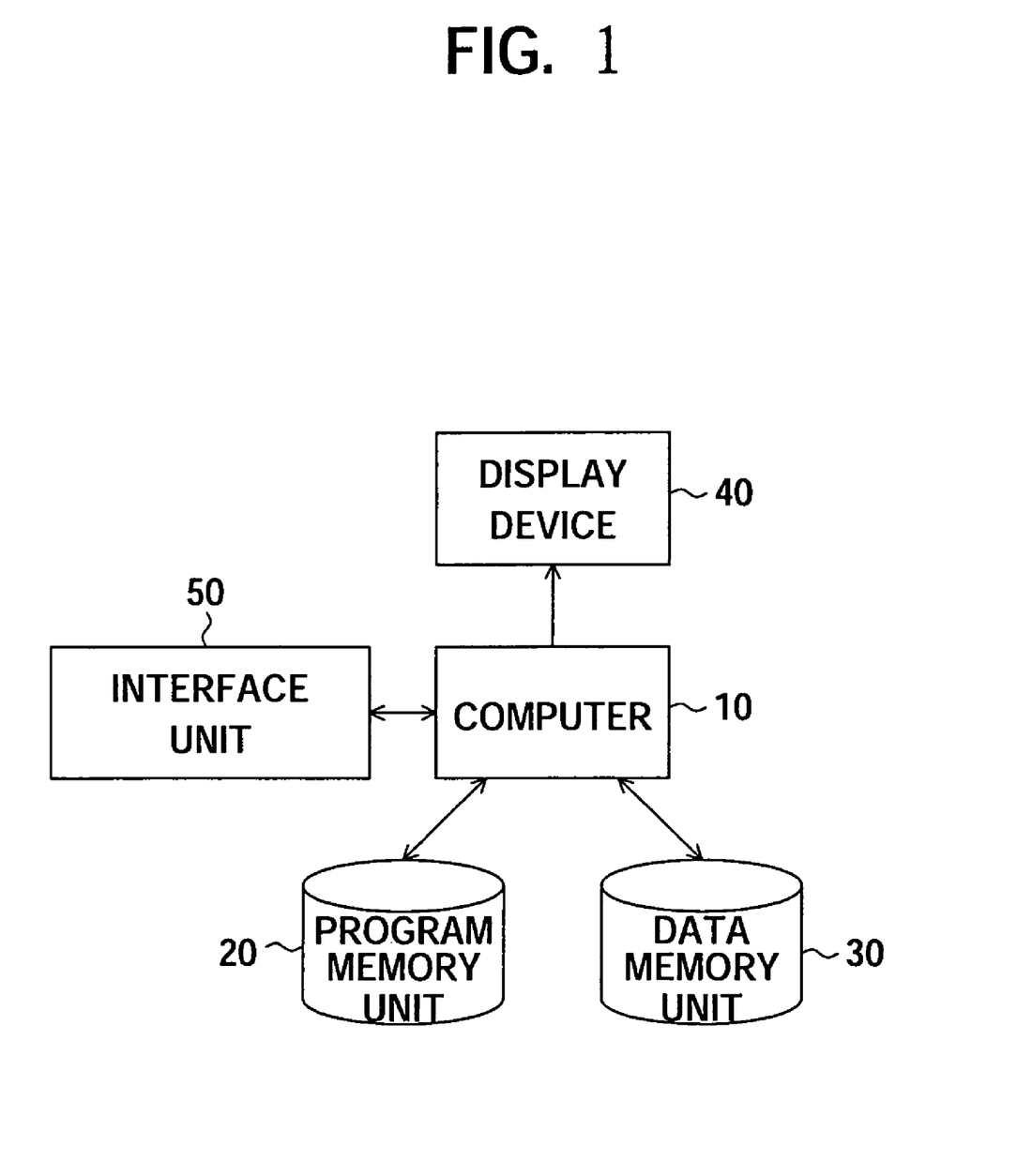
FIG. 1 is a view of an example of the hardware configuration of an integrated circuit design system according to an embodiment of the present invention.

FIG. 1 is a view of an example of a hardware configuration of an integrated circuit design system according to an embodiment of the present invention.

The integrated circuit design system shown in FIG. 1 has a computer 10, a program memory unit 20, a data memory unit 30, a display device 40, and an interface unit 50.

The computer 10 reads out and executes an integrated circuit design program stored in the program memory unit 20 and executes the processing explained later concerned with the design of the integrated circuit.

The program memory unit 20 stores the integrated circuit design program to be executed in the computer 10.

The data memory unit 30 stores the data used in the process of execution of the processing in the computer 10 and the data as the result of the execution. For example, it stores the circuit data of the operation level or the RTL (register transfer level) data, net list of the gate level, or other circuit data to be processed by the integrated circuit design program.

The display unit 40 displays an image under the control of the computer 10. For example, along with the execution of the integrated circuit design program, it displays an image prompting the input of a command from the user, an image of the result of execution of the simulation, etc.

The interface unit 50 includes for example a keyboard, a mouse, or another device for a user to input information to the computer 10. Further, it includes for example an optical disc device, a network interface device, or other device for inputting or outputting the circuit data processed in the integrated circuit design system.

Figure 2:
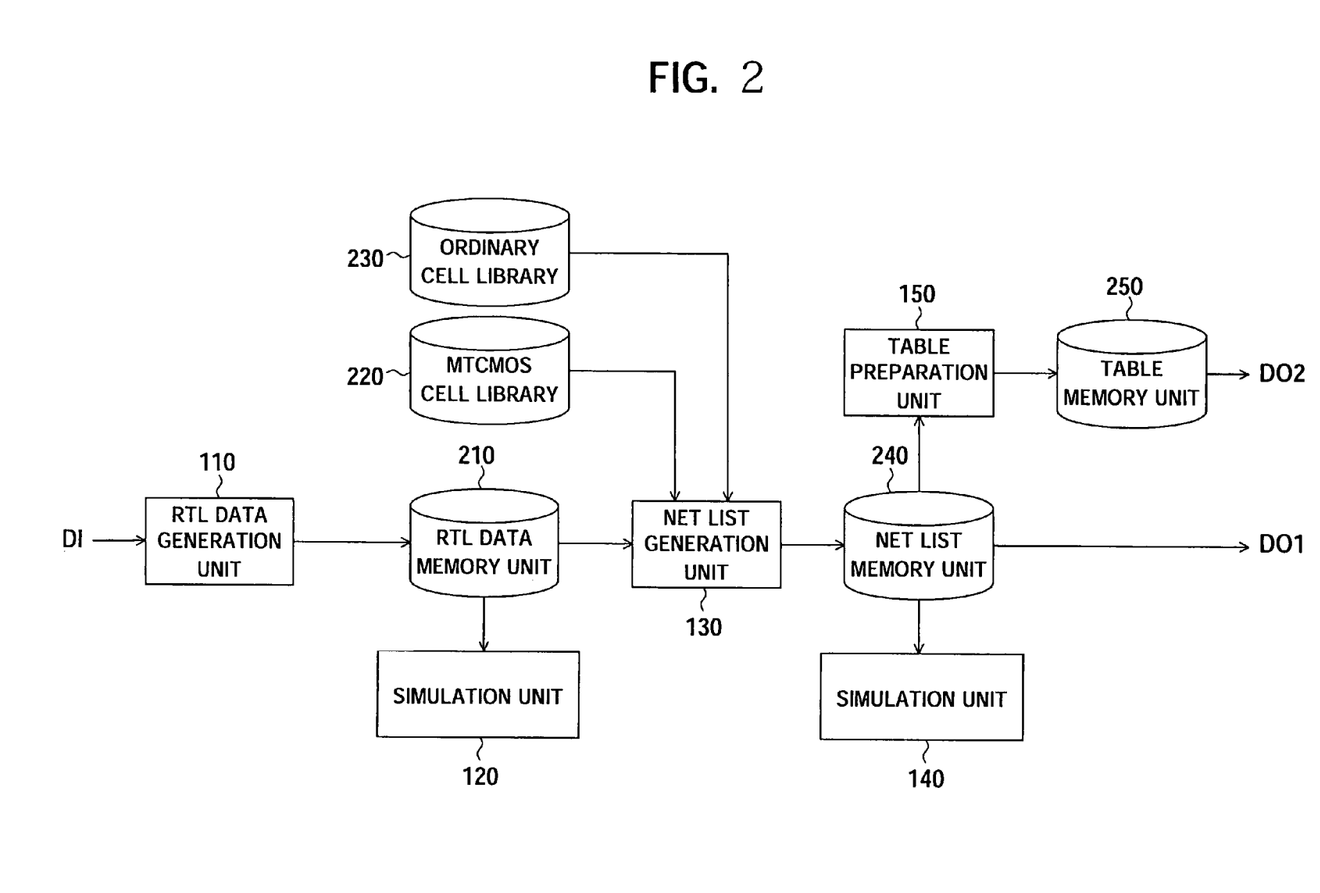
FIG. 2 is a view of an example of the functional configuration of an integrated circuit design system according to an embodiment of the present invention.

FIG. 2 is a view of an example of the functional configuration of the integrated circuit design system according to an embodiment of the present invention and illustrates the functional configuration realized by an integrated circuit design program.

The integrated circuit design system shown in FIG. 2 has an RTL data generation unit 110, simulation units 120 and 140, a net list generation unit 130, a table preparation unit 150, an RTL data memory unit 210, an MTCMOS cell library 220, an ordinary cell library 230, a net list memory unit 240, and a table memory unit 250.

Note that the RTL data generation unit 110 is an embodiment of the first circuit data generating means of the present invention, the net list generation unit 130 is an embodiment of the second circuit data generating means of the present invention, the simulation units 120 and 140 are an embodiment of the simulating means of the present invention, and the table preparation unit 150 is an embodiment of the table preparing means of the present invention.

The RTL data generation unit 110 generates RTL data including a description corresponding to a power switch cell. The RTL data is circuit data describing a logic circuit by a hierarchical structure by using for example VHDL, verilog-HDL, or other hardware description language.

Note that the "hierarchical structure" referred to here means a structure, when expressing a certain set of circuits as a first hierarchical block and a smaller set of circuits included inside these circuits as a second hierarchical block, defining the relationship among hierarchical blocks designating the second hierarchical block as belonging to a lower level than the first hierarchical block. In other words, this means a structure defining the relationship among the hierarchical blocks assuming that a lower hierarchical block is included in an upper hierarchical block.

The RTL data generation unit 110 receives as input circuit data (operation description data) DI described at the operation level by for example the C language or other higher language and performs operation combining processing on this to thereby generate the RTL data.

The RTL generation unit 110 describes MTCMOS circuits whose power should be cut off in response to a control signal as one or more independent hierarchical blocks at the time of generation of this RTL data. Which circuit block is an MTCMOS circuit is designated by for example information described in the operation description data or information stored in a file different from the operation description data.

Further, the RTL data generation unit 110 prepares a description of an upper hierarchical block with a lower level comprised of a hierarchical block of an MTCMOS circuit whose power should be cut off and a virtual power switch cell defined in the description of the RTL data (hereinafter described as a "virtual power switch cell"). The virtual power switch cell receives as input the control signal used for cutoff of the power supply of the MTCMOS circuit.

By preparing such a description, a hierarchical block included at the same level as a virtual power switch cell is clearly expressed as a hierarchical block whose power should be cut off.

Figure 3:
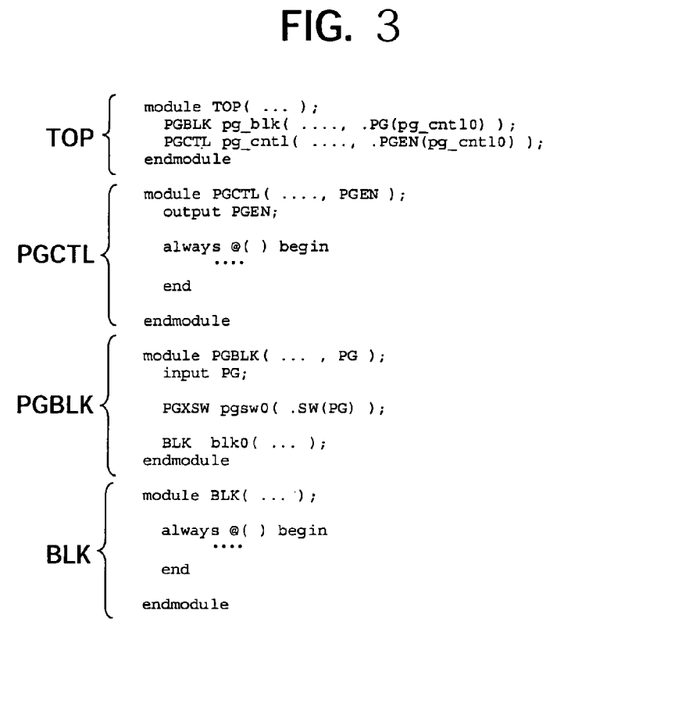
FIG. 3 is a view of an example of the description of RTL data generated by an RTL data generation unit.
Figure 4:
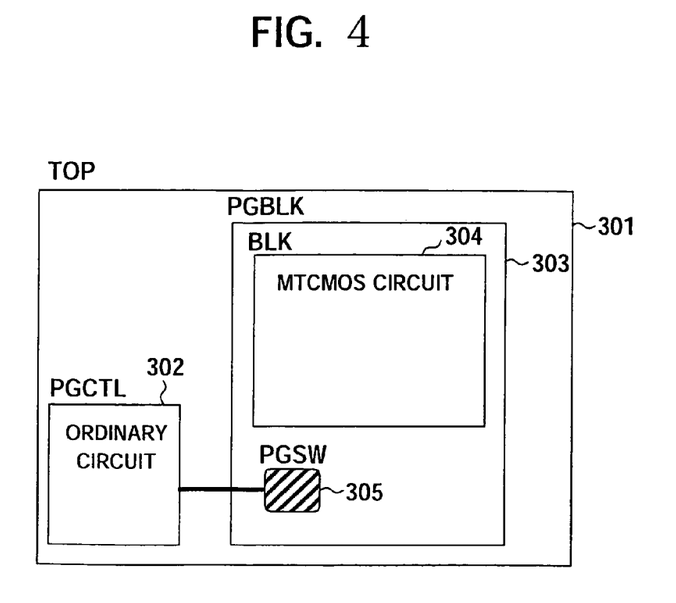
FIG. 4 is a view illustrating a hierarchical structure of the RTL data shown in FIG. 3.

FIG. 3 is a view of an example of the description of the RTL data generated at the RTL data generation unit 110, while FIG. 4 is a view illustrating the hierarchical structure thereof.

In FIG. 3 and FIG. 4, a TOP block 301, a PGCTL block 302, a PGBLK block 303, and a BLK block 304 express hierarchical blocks, and a PGSW cell 305 expresses a power switch cell.

The lower level of the TOP block 301 includes the PGCTL block 302 and the PGBLK block 303. The lower level of the PGBLK block 303 includes the BLK block 304 and the PGSW cell 305.

Among these hierarchical blocks, the PGCTL block 302 and the BLK block 304 describe the substantial operation.

In the example of FIG. 3 and FIG. 4, the hierarchical block at the same level as the PGSW cell 305 is the BLK block 304. Accordingly, the BLK block 304 is recognized as the hierarchical block of an MTCMOS circuit whose power should be cut off by the power switch cell. On the other hand, the PGCTL block 302 does not include a virtual power switch cell at the same level and the upper level, so is recognized as a hierarchical block of an ordinary circuit whose power is not to be cut off.

The RTL data memory unit 210 is one of the memory regions allocated to the data memory unit 30 and stores the RTL data generated at the RTL data generation unit 110.

The MTCMOS cell library 220 is one of the memory regions allocated to the data memory unit 30 and stores the information of the circuit cells used when generating the net list of the MTCMOS circuits.

The ordinary cell library 230 is one of the memory regions allocated to the data memory unit 30 and stores the information of the circuit cells used when generating the net list of the ordinary circuits not MTCMOS circuits.

The net list generation unit 130 performs logic combining processing for the RTL data generated at the RTL data generation unit 110 to thereby generate a net list of the gate level comprised by combining the basic circuit cells such as NAND gates and NOT gates. The net list of the gate level is circuit data described by the hierarchical structure in the same way as the RTL data.

Further, the net list generation unit 130 decides on a library of the circuit cells used for the logic combining processing in accordance with whether or not the hierarchical blocks for combination are MTCMOS circuits.

Namely, the net list generation unit 130 examines whether or not there is a virtual power switch cell at the same level or an upper level for each hierarchical block of the RTL data generated at the RTL data generation unit 110. Then, logic combining processing is carried out using the information of the circuit cells of the MTCMOS cell library 220 for the hierarchical blocks in which there are virtual power switch cells at the same level or an upper level as a result of this examination, while logic combining processing is carried out using the information of the circuit cells of the ordinary cell library 230 for the hierarchical blocks in which there are no power switch cells at the same level or an upper level.

The net list memory unit 240 is one of the memory regions allocated to the data memory unit 30 and stores the net list generated at the net list generation unit 130.

The simulation unit 120 reads out the RTL data from the RTL data memory unit 210 and simulates the operation of circuits according to the description thereof.

For example, the simulation unit 120 reads out an operation model for simulation corresponding to the description of the RTL data from a not illustrated dedicated library and executes the operation in accordance with this.

This library includes also an operation model for simulation corresponding to the description of the virtual power switch cell mentioned above. If the description of a virtual power switch cell is included in the RTL data, the simulation unit 120 executes the following operation according to this operation model.

Figure 5:
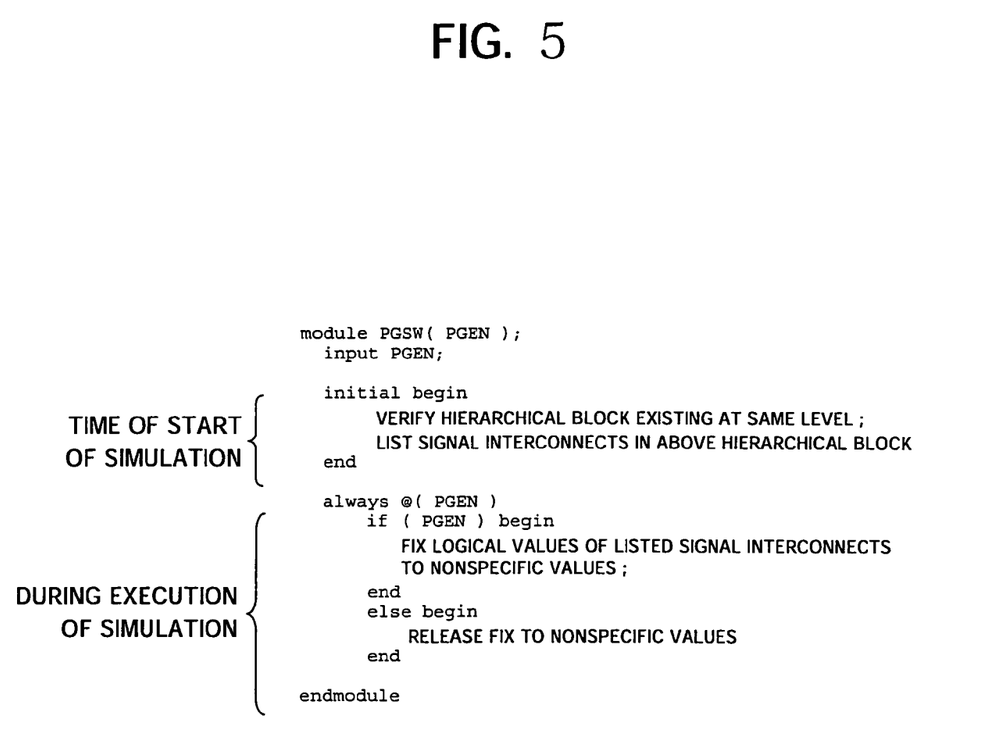
FIG. 5 is a view of an example of the description of a simulation use operation model of a virtual power switch cell.

FIG. 5 is a view of an example of the description of a simulation use operation model of a virtual power switch cell.

This operation model description includes instructions for acquiring a list of signal interconnects included in the hierarchical block of the same level as a virtual power switch cell when starting the simulation.

Further, when a control signal instructing a cutoff of the power is input to the virtual power switch cell in the process of simulation, an instruction for fixing the logic value of the signal interconnects included in the list to nonspecific values and continuing the simulation is included.

Further, when a control signal instructing the supply of power is input to a virtual power switch cell in the process of simulation, an instruction for releasing the fix of the logic value of the signal interconnects included in the above list to nonspecific values and continuing the simulation is included.

The simulation unit 120 executes simulation according to the description of such an operation model.

The simulation unit 140 reads out a net list from the net list memory unit 240 and simulates the operation of the circuits according to the description thereof.

The simulation unit 140 also reads out a simulation use operation model corresponding to the description of the net list from a not illustrated library in the same way as the simulation unit 120 and executes the operation in accordance with this. The simulation use operation model of a virtual power switch cell describes instructions the same as those of FIG. 5, therefore, when the description of a virtual power switch cell is included in the net list, the simulation unit 140 executes the same operation as that of the simulation unit 120.

The table preparation unit 150 retrieves virtual power switch cells from the net list stored in the net list memory unit 240 and prepares a table linking instance names of the virtual power switch cells found by the retrieval and instance names of all circuit cells in the hierarchical blocks belonging to the same levels as the virtual power switch cells. Here, the "instance name" of a circuit cell means information indicating an individual circuit cell. The same is also true for the instance name of a virtual power switch cell.

The table memory unit 250 is one of the memory regions allocated to the data memory unit 30 and stores the table prepared in the table preparation unit 150.

Next, an explanation will be given of the operation of the integrated circuit design system having the above configuration.

First of all, the flow of the entire operation will be explained.

First, the RTL data generation unit 110 performs operation combining processing on the operation description data DI of the circuits described by the C language etc. to generate RTL data including a description expressing the MTCMOS circuits. The net list generation unit 130 performs logic combining processing on this RTL data to generate a net list DO1 of the gate levels. Further, the table preparation unit 150 prepares a table indicating the correspondence between the virtual power switch cells and the circuit cells based on this generated net list DO1.

In the flow of generation of such circuit data, for verifying the circuit operation, the simulation unit 120 simulates the RTL data, and the simulation unit 140 simulates the net list.

Below, a detailed explanation will be given of the operations of the RTL data generation unit 110, the simulation units 120 and 140, the net list generation unit 130, and the table preparation unit 150 in this sequence.

Figure 6:
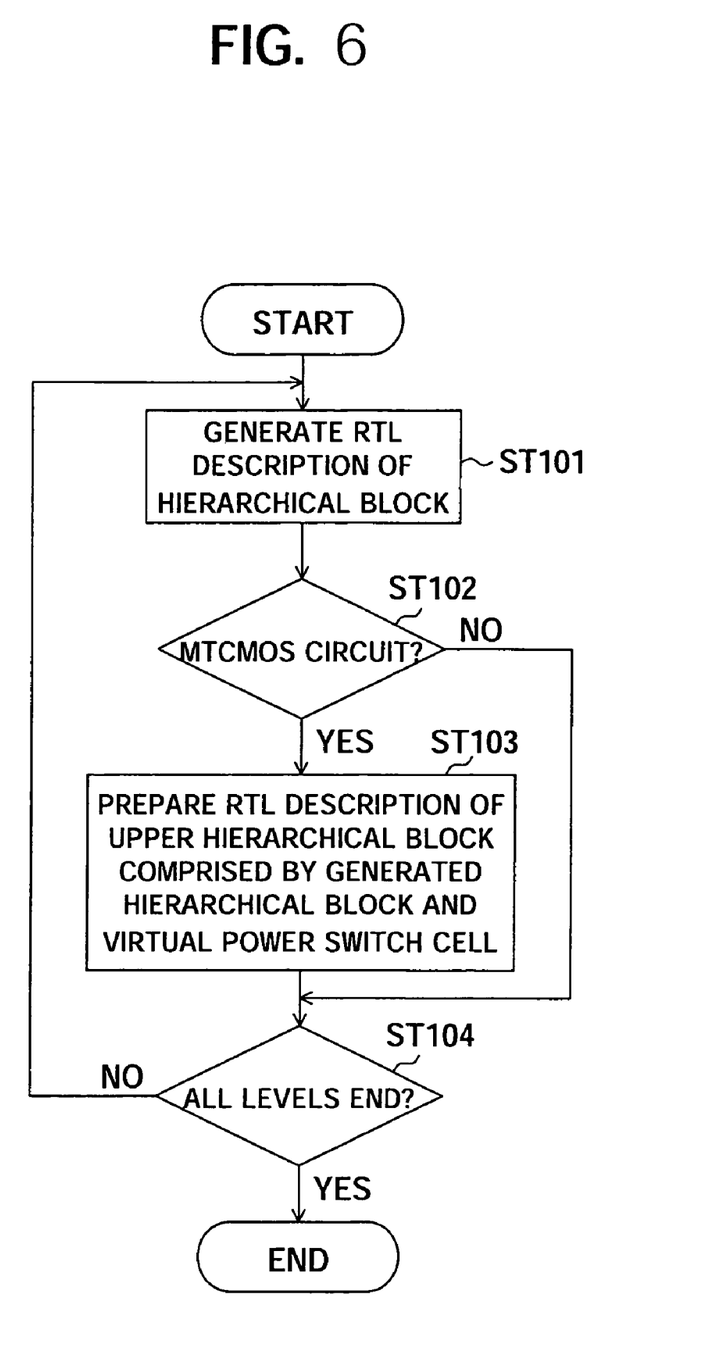
FIG. 6 is a flowchart of an example of the flow of the processing in the RTL data generation unit.

FIG. 6 is a flowchart of an example of the flow of the processing in the RTL data generation unit 110.

The RTL data generation unit 110 performs operation combining processing on each hierarchical block when receiving the operation description data DI to generate an RTL description (step ST101).

Then, the RTL data generation unit 110 judges whether or not the hierarchical block generating the RTL description is an MTCMOS circuit based on the information included in the operation description data DI, the information stored in a file different from the operation description data DI, etc. (step ST102).

When the hierarchical block is an MTCMOS circuit, the RTL data generation unit 110 prepares an RTL description of an upper level with a lower level comprised by this hierarchical block and the virtual power switch cell (step ST103).

When the hierarchical block is not an MTCMOS circuit, the RTL data generation unit 110 skips the processing of step ST103.

After the processing of steps ST102 and ST103, the RTL data generation unit 110 judges whether or not the operation for combining all hierarchical blocks in the operation description data DI has ended. When there is a hierarchical block which has not yet been combined, the routine returns to step ST101, where the above processing is repeated. When the operation for combining all hierarchical blocks has ended, the RTL generation processing is terminated.

Figure 7:
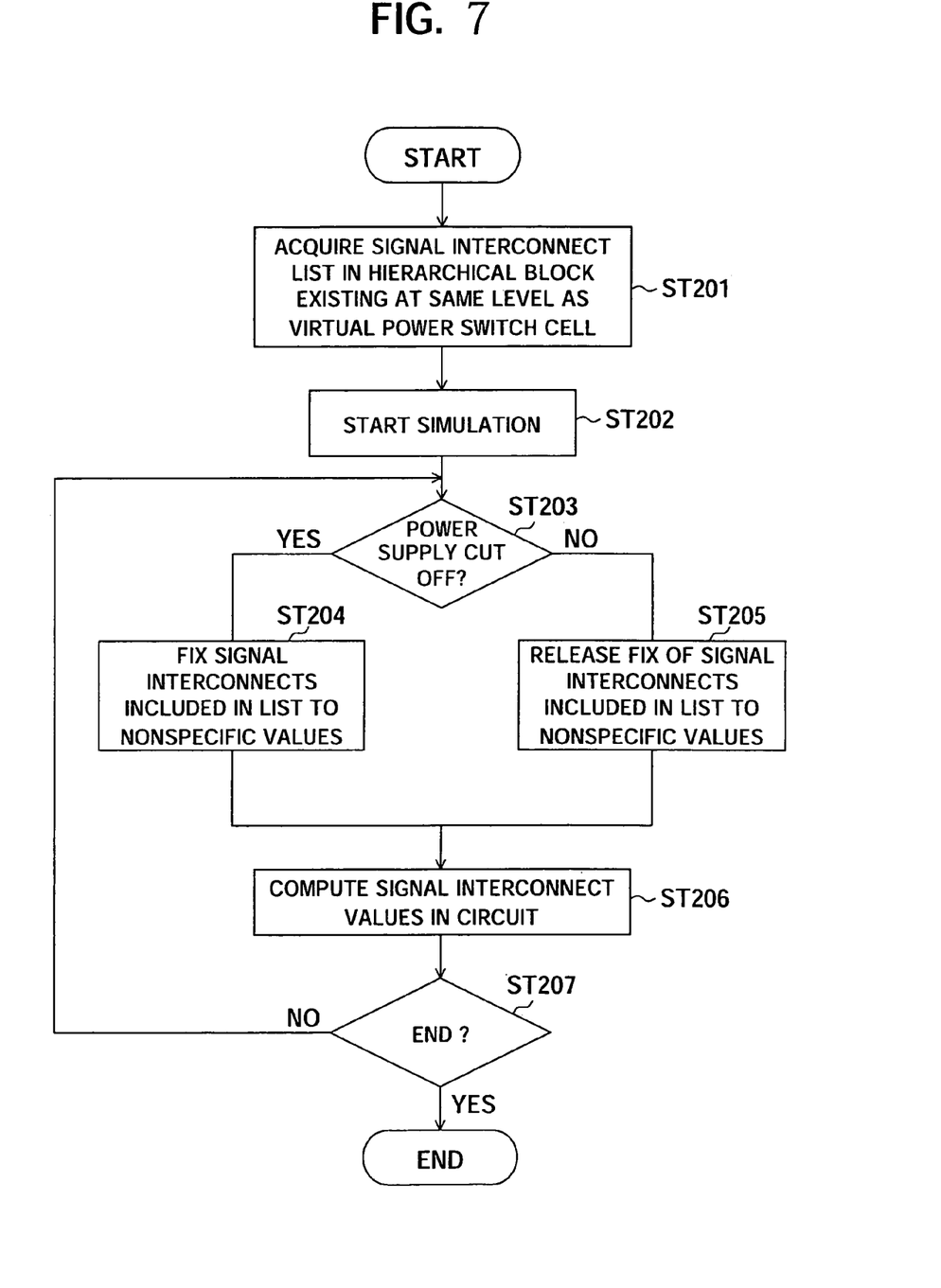
FIG. 7 is a flowchart of an example of the flow of the processing in the simulation unit when there is a description of a virtual power switch cell in the RTL data.

FIG. 7 is a flowchart of an example of the flow of the processing in the simulation unit 120 when there is a description of a virtual power switch cell in the RTL data.

First, the simulation unit 120 reads out the RTL data stored in the RTL data memory unit 210 and acquires a list of the signal interconnects included in the hierarchical blocks of the same levels as the power switch cells (step ST201). The list includes for example the instance names of all signal interconnects included in the hierarchical blocks of the same levels as the power switch cells.

After acquiring the list, the simulation unit 120 starts the simulation.

The simulation unit 120 monitors whether or not the value of the control signal instructing the cutoff of the power changed in the process of the simulation (step ST203).

As a result of this monitoring, when a control signal of a value instructing the cutoff of the power is input to a virtual power switch cell, the simulation unit 120 fixes the logical values of the signal interconnects included in the list acquired at step ST201 to nonspecific values (step ST204). Conversely, when a control signal of a value instructing the supply of power is input to a virtual power switch cell, the fix of the values of the signal interconnects to nonspecific values carried out in step ST204 is released (step ST205).

After the processing of steps ST201 and ST204, the simulation unit 120 computes the values of the signal interconnects in the circuit again (step ST206). Then, if the end condition of the simulation has not been reached, the routine returns to step ST203 again, where the change of the control signal of the virtual power switch cell is monitored, while if the end condition of the simulation is reached, the simulation is terminated (step ST207).

As already explained, the operation of the simulation unit 120 is described in the simulation use operation model of the virtual power switch cell and previously recorded in a not illustrated library. When there is a description of a virtual power switch cell in the RTL data, the above operation is automatically executed at the time of simulation.

The operation of the simulation unit 140 in the ca-se where there is a description of a virtual power switch cell in the net list is the same as the operation shown in the flowchart of FIG. 7 explained above.

Figure 8:
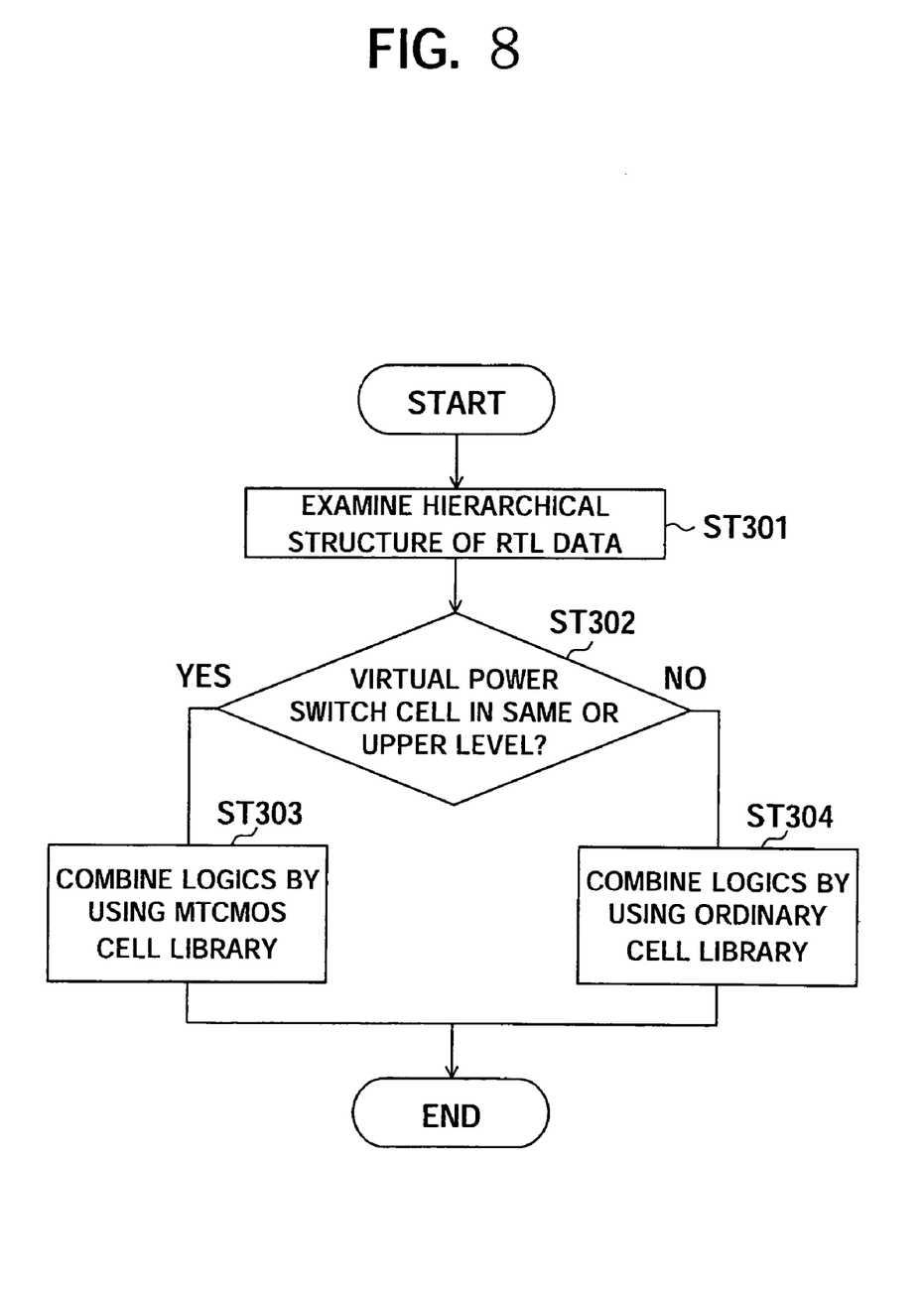
FIG. 8 is a flowchart of an example of the flow of the processing in a net list generation unit.

FIG. 8 is a flowchart of an example of the flow of the processing in the net list generation unit 130.

First, the net list generation unit 130 reads out the RTL data stored in the RTL data memory unit 210 and examines whether or not there is a virtual power switch cell at the same level or an upper level (step ST301).

The net list generation unit 130 judges a hierarchical block for which there is a virtual power switch cell at the same level or upper level as an MTCMOS circuit and a hierarchical block for which there is no virtual power switch cell as an ordinary circuit based on the examination results of step ST301 (step ST302).

Then, logic combining processing is carried out on a hierarchical block judged as a MTCMOS circuit by using the MTCMOS cell library (step ST303), and logic combining processing is carried out on a hierarchical block judged as an ordinary circuit by using the ordinary cell library 230 (step ST304).

Figure 9:
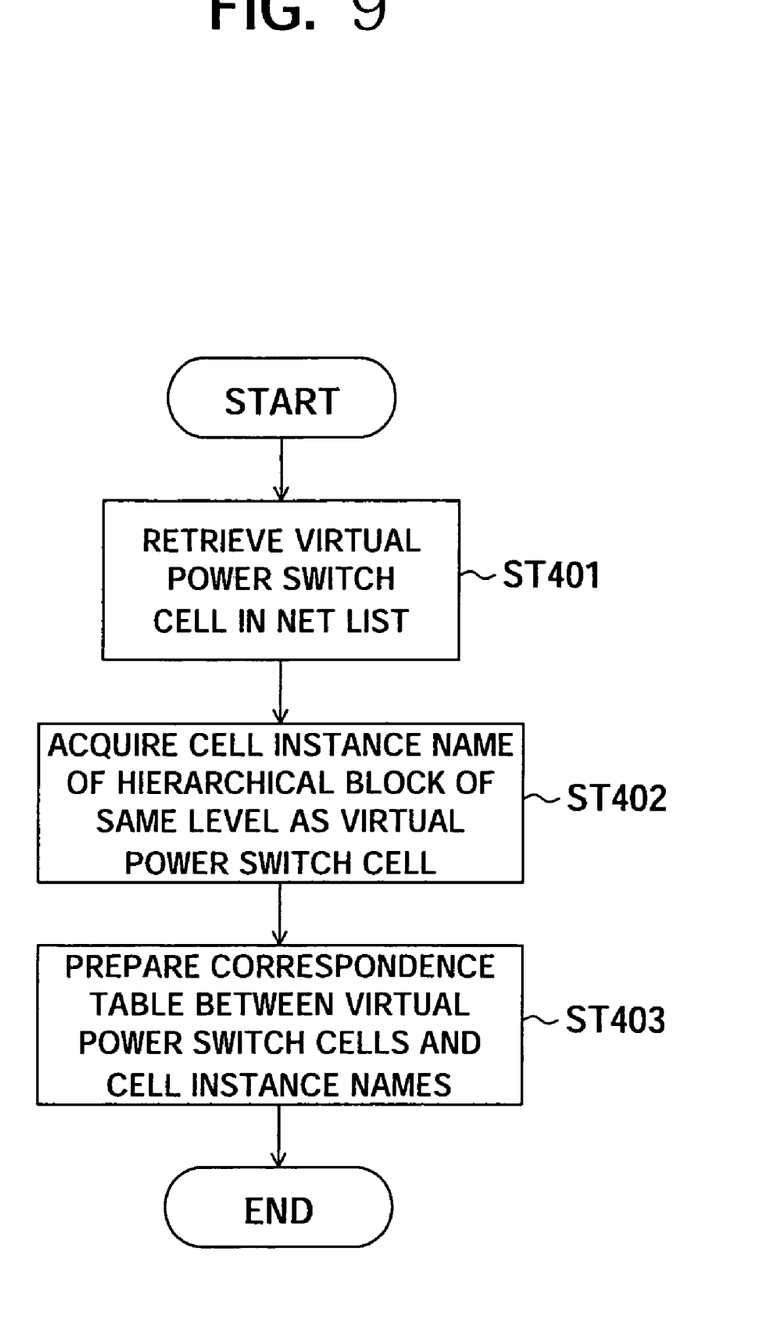
FIG. 9 is a flowchart of an example of the flow of the processing in a table preparation unit.

FIG. 9 is a flowchart of an example of the flow of the processing in the table preparation unit 150.

First, the table preparation unit 250 reads out the net list stored in the net list memory unit 240 and retrieves virtual power switch-cells from the description (step ST401). When a virtual power switch cell is found, the instance names of all circuit cells included in the hierarchical block at the same level as the virtual power switch cell are investigated thoroughly (step ST402).

Then, the table preparation unit 250 prepares a table linking the instance name of the virtual power switch cell found in step ST401 and the instance names of the circuit cells acquired at step ST402. When there are a plurality of virtual power switch cells, a table linking the instance names of the virtual power switch cells and the instance names of the circuit cells for cutoff of the power supply is prepared.

As explained above, according to the present embodiment, in the description of the RTL data generated at the RTL data generation unit 110, a hierarchical block of an upper level with a lower level comprised of a hierarchical block corresponding to a circuit whose power should be cut off in response to a control signal and a predetermined virtual power switch cell to which this control signal is input is prepared.

For this reason, by obtaining a grasp of the relationship between a virtual power switch cell in the description of the RTL data and a hierarchical block of the same level as the virtual power switch cell, the relationship between the power switch cell and the circuit for cutoff of the power in a real circuit can be clearly grasped. In other words, by examining the hierarchical block belonging to the same level as a virtual power switch cell, an MTCMOS circuit which is connected to a common virtual power supply line and for which the power is commonly turned on/off can be clearly grasped.

Further, the virtual power switch cell in the description of the circuit data corresponds to at least one of the power switch cells in the real circuit, so it is not necessary to delete the description of the virtual power switch cell in the design of the layout stage.

For this reason, the work of deleting an unnecessary description as in the prior art can be eliminated, and the design efficiency can be improved.

Further, in the description of the virtual power switch cell, the function for the simulation of fixing the signal interconnect values of the MTCMOS circuit whose power should be cut off to nonspecific values is installed. For example, when the operation model for the simulation describing this function is previously registered in the library, and there is the description of a virtual power switch cell in the circuit data, the above operation of fixing the signal interconnects to the nonspecific values is executed according to the operation model for the virtual power switch cell read out from this library.

For this reason, it is not necessary to add a specific description used for only the simulation to the circuit data as shown in Japanese Unexamined Patent Publication (Kokai) No. 2003-233635 and the trouble of deleting such an unnecessary description in the layout design stage does not occur. In this point as well, an improvement of the design efficiency can be achieved.

Further, generally, the conditions such as the ground potential and the power supply voltage drop differ between the constantly powered ordinary circuits and the MTCMOS circuits whose power should be cut off, so it is necessary to use circuit cells adapted to them.

According to the present embodiment, it is possible to accurately judge the hierarchical blocks whose power should be cut off and the hierarchical blocks whose power should not be cut off by the virtual power switch cells by utilizing the hierarchical structure of the RTL data and combine logics for each by using the previously prepared cell library. For this reason, an improvement of the design efficiency can be achieved in comparison with the case where such work is manually carried out.

Further, in order to perform the layout design of a semiconductor integrated circuit including MTCMOS circuits, in addition to the information of the input/output relationship of the signals, the information of the power supply indicating to which ground lines and power lines which circuit cells are connected is necessary.

According to the present embodiment, it becomes possible to automatically prepare a correspondence table between the virtual power switch cells included in the net list and the circuit cells whose power should be cut off by utilizing the hierarchical structure of the net list. For this reason, in comparison with the case where such work is manually carried out, an improvement of the design efficiency can be achieved.

Note that the present invention is not limited to the above embodiment and includes various modifications.

In the above embodiment, the example where the RTL data generation unit 110 generated the RTL data from the operation description data by operation combining processing was shown, but the present invention is not limited to this.

For example, it is also possible if RTL data the same as the case of the operation combining processing is generated by acquiring RTL data describing the circuits for cutoff of power as independent hierarchical blocks and adding to or changing the description expressing the MTCMOS circuits to this RTL data.

In this case, for example, first, the hierarchical blocks of the circuits for cutoff of power are retrieved from the input RTL data. This retrieval is carried out according to information designating the hierarchical blocks of the circuits for cutoff of power in the same way as the case of for example the operation combining processing. Then, the upper hierarchical blocks with lower levels comprised of hierarchical blocks found by the retrieval and the virtual power switch cells are newly described in the RTL data.

In this method of generation of the RTL data as well, the same effects as those of the above embodiment are obtained.

In the above embodiment, the RTL data etc. were explained as the circuit data used for the design of an integrated circuit, but this is an example. The present invention can be applied to the circuit data of any other format describing a logic circuit by a hierarchical structure.

In the above embodiment, the processing of the integrated circuit design system was realized by a computer and a program, but the invention is not limited to this; it is also possible to realize at least part by hardware.

The integrated circuit which can be designed in the present invention is not limited to a CMOS semiconductor integrated circuit. The present invention can also be applied to other types of integrated circuits.

While the invention has been described with reference to specific embodiments chosen for purpose of illustration, it should be apparent that numerous modifications could be made thereto by those skilled in the art without departing from the basic concept and scope of the invention.

The invention claimed is:

1. An integrated circuit design system for designing, in a design layout stage, a real integrated circuit based on circuit data describing a logic circuit by a hierarchical structure in which a lower level hierarchical block is included in an upper level hierarchical block, comprising:
    a first circuit data generating means for receiving input circuit data sufficient to generate RTL data from a source, said first circuit data including an RTL generation unit describing a first hierarchical block to which a supply of power should be cut off in response to a control signal as a first hierarchical block and a switch power cell, and
    a second circuit data generating means, including a net list generation unit, for generating second circuit data describing a second hierarchical block with a lower level comprised by said first hierarchical block and a virtual power switch cell to which said control signal is input so that said virtual power switch cell of said second circuit data corresponds to at least one power switch cell in said real integrated circuit when implemented; and means for storing said first and second circuit data in a non-transitory storage medium capable of implementing said real integrated circuit from said design layout stage.

2. The integrated circuit design system as set forth in claim 1, further comprising a simulating means for simulating operation of a circuit according to a description of the circuit data generated at said generating means, wherein the circuit data includes a description of a power switch cell, wherein
the simulating means,
acquires a list of signal interconnects included in a hierarchical block of the same level as said power switch cell when starting a simulation,
fixes the logical values of signal interconnects included in said acquired list to nonspecific values and continues the simulation when a control signal instructing cutoff of power is input to said power switch cell in the process of said simulation operation, and
releases the fix of the logical values of the signal interconnects included in said acquired list to nonspecific values and continues the simulation when a control signal instructing supply of power is input to said power switch cell in the process of said simulation operation.

3. The integrated circuit design system as set forth in claim 1, wherein:
said first circuit data generating means for generating circuit data describing said second hierarchical block based on circuit data describing said first hierarchical block and
said second circuit data generating means for generating circuit data of a logic circuit comprised by combining predetermined circuit cells by logic combining processing on the circuit data generated at said first circuit data generating means, and
said second circuit data generating means examines whether or not there is a power switch cell at the same level or an upper level for each hierarchical block of the circuit data generated at said first circuit data generating means, performs said logic combining processing by using the information of circuit cells previously prepared for a circuit cut off in power for a hierarchical block in which there is a power switch cell at the same level or an upper level as a result of the examination, and performs said logic combining processing by using information of circuit cells previously prepared for a circuits not cut off in power for a hierarchical block in which there is no power switch cell at the same level or an upper level.

4. The integrated circuit design system as set forth in claim 1, wherein said first circuit data generating means generates circuit data describing a logic circuit by said hierarchical structure by operation combining processing on operation description data describing a logic circuit by operations and prepares a description describing a circuit as said first hierarchical block and a description of said second hierarchical block with a lower level comprised by said first hierarchical block and said power switch cell according to previously given information for designating a circuit whose power should be cut off in response to a control signal at the time of generation.

5. The integrated circuit design system of claim 1, wherein said integrated circuit design includes MCTMOS technology.

6. An integrated circuit design program embedded on a non-transitory computer readable storage medium for enabling a machine for causing a computer to design, in a design layout stage, a real integrated circuit based on circuit data describing a logic circuit by a hierarchical structure in which a lower hierarchical block is included in an upper hierarchical block, the non-transitory readable storage medium comprising the steps of:
a first instruction code for acquiring from a source first circuit data including circuit data sufficient to generate RTL data describing a circuit having a power switch cell whose power should be cut off in response to a control signal as a first hierarchical block and
a second instruction code for generating second circuit data including net generation data describing a second hierarchical block with a lower level comprised by said first hierarchical block and a predetermined virtual power switch cell to which said control signal is input so that said virtual power switch cell of said second circuit data corresponds to at least one power switch cell in said real integrated circuit, and
a final instruction code for storing said integrated circuit design program on a non-transitory readable storage medium capable of implementing said real integrated circuit.

7. The integrated circuit design program as set forth in claim 6, further comprising a third instruction code for simulating the operation of a circuit according to the description of the circuit data generated at said second step, wherein when the circuit data includes a description of said power switch cell,
wherein said third step performs
acquiring a list of signal interconnects included in a hierarchical block of the same level as said power switch cell when starting said simulation,
fixing the logical values of the signal interconnects included in said acquired list to nonspecific values and continues the simulation when a control signal instructing cutoff of the power is input to said power switch cell in the process of said simulation operation, and
releasing the fix of the logical values of the signal interconnects included in said acquired list to the nonspecific values and continues the simulation when a control signal instructing supply of power is input to said power switch cell in the process of said simulation operation.

8. The integrated circuit design program as set forth in claim 6, wherein said second step includes
a fourth instruction code for generating circuit data describing said second hierarchical block based on the circuit data acquired at said first step,
a fifth instruction code for examining whether or not there is a power switch cell at the same level or an upper level for each hierarchical block of the circuit data generated at said fourth step, and
a sixth instruction code for generating circuit data of a logic circuit comprised by combining predetermined circuit cells by logic combining processing on the circuit data generated at said fourth step, and
wherein said sixth step carries out said logic combining processing by using the information of circuit cells previously prepared for a circuit whose power is cut off for a hierarchical block in which there is a power switch cell at the same level or an upper level as a result of the examination at said fifth step and carries out said logic combining processing by using the information of circuit cells previously prepared for a circuit whose power is not cut off for a hierarchical block in which there is no power switch cell at the same level or an upper level.

9. The integrated circuit design program of claim 6, wherein said real integrated circuit design includes MCTMOS technology.

10. An integrated circuit design method, storable on a non-transitory readable storage medium, for designing, in a design layout stage, a real circuit based on circuit data describing a logic circuit by a hierarchical structure in which a lower hierarchical block is included in an upper hierarchical block, comprising the steps of:
- a first step of acquiring, by a computer system, first circuit data describing a circuit having a power switch cell whose power should be cut off in response to a control signal as a first hierarchical block and
- a second step of generating, by the computer system, second circuit data describing a second hierarchical block with a lower level comprised by said first hierarchical block and a predetermined virtual power switch cell to which said control signal is input so that said virtual power switch cell of said second circuit data corresponds to at least one power switch cell in said real circuit.

11. The integrated circuit design method as set forth in claim 10, further having a third step of simulating, by the computer system, the operation of a circuit according to the description of the circuit data generated at said second step, wherein when the circuit data includes a description of said power switch cell,
- wherein said third step performs
  - acquiring, by the computer system, a list of signal interconnects included in a hierarchical block of the same level as said power switch cell when starting said simulation,
  - fixing, by the computer system, the logical values of the signal interconnects included in said acquired list to nonspecific values and continues the simulation when a control signal instructing cutoff of power is input to said power switch cell in the process of said simulation operation, and
  - releasing, by the computer system, the fix of the logical values of the signal interconnects included in said acquired list to nonspecific values and continues the simulation when a control signal instructing supply of power is input to said power switch cell in the process of said simulation operation.

12. The integrated circuit design method as set forth in claim 11, wherein said second step includes
- a fourth step of generating, by the computer system, circuit data describing said second hierarchical block based on circuit data acquired at said first step,
- a fifth step of examining, by the computer system, whether or not there is a power switch cell at the same level or said upper level for each hierarchical block of the circuit data generated at said fourth process, and
- a sixth step of generating, by the computer system, circuit data of the logic circuit comprised by combining predetermined circuit cells by logic combining processing on the circuit data generated at said fourth step, and
- wherein said sixth step performs said logic combining processing by using information of the circuit cells previously prepared for a circuit whose power should be cut off for a hierarchical block in which there is a power switch cell at the same level or an upper level as a result of the examination at said fifth step and performs said logic combining processing by using information of the circuit cells previously prepared for a circuit whose power is not cut off for a hierarchical block in which there is no power switch cell at the same level or an upper level.

13. The integrated circuit design method of claim 10 wherein said integrated circuit includes MCTMOS technology.

* * * * *